July 4, 1933.  F. E. KEY  1,916,574

METHOD OF MAKING GILL RING TUBES

Filed May 19, 1930

INVENTOR
FREDERICK E. KEY
BY Edward E. Longan
ATTY.

Patented July 4, 1933

1,916,574

UNITED STATES PATENT OFFICE

FREDERICK E. KEY, OF ST. LOUIS, MISSOURI, ASSIGNOR TO KEY BOILER EQUIPMENT COMPANY, OF EAST ST. LOUIS, ILLINOIS, A CORPORATION OF MISSOURI

METHOD OF MAKING GILL RING TUBES

Application filed May 19, 1930. Serial No. 453,674.

My invention relates to improvements in gill ring tubes and method of making the same, and has for its primary object a tube provided with a plurality of longitudinally spaced apart gills or fins in which the gills are made of sections spaced apart both radially and longitudinally, the spaces being staggered so that the heat traveling along the tube will travel in a sinuous path.

My tubes are especially useful in heat exchangers such as are used in oil stills, superheaters and the like.

A further object is to construct a gill ring tube in which the gills or fins have a metal to metal contact throughout so as to avoid any insulating spaces whatsoever and permit ready radiation to and from the tube.

A further object is a method of constructing gill ring tubes in which the gills or fins are electrically welded to the outside surface of the tube without the necessity of separate welding devices and in which the tube and gill rings form the conductors.

Heretofore in the construction of gill ring tubes, several methods were employed one of which was heating up the gill ring after boring it out to an inside diameter slightly less than the outside diameter of the tube and after heating the ring place it over the tube, then cool the ring causing it to shrink on to the tube. This method, however, did not compensate for irregularities in the surface of the tube, consequently air spaces were left which acted as insulators.

Another method was welding the rings on by means of an electric arc by the addition of electrically deposited metal. This also frequently left air spaces.

By my method, however, the electric arc and pressure are simultaneously used and by making the gill rings in sections instead of a continuous ring, I obtain a metal to metal contact between the ring and tube.

In the drawing, Fig. 1 is an end view of a tube showing my gill ring sections in position.

Figure 1:
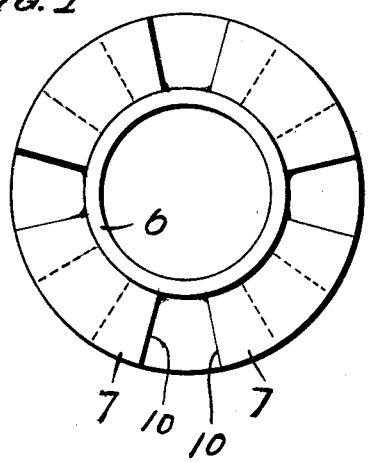

In the construction of my device, I employ a tube 6 which is of any metal suitable for the peculiar use to which it is to be put.

7 represents the fins or gills employed. These fins or gills are made in segments of such size that when placed in position, the ends thereof will not contact.

In the drawing, I have disclosed the use of four of such segments in one plane, although I do not desire to limit myself to this precise construction, because the segments may be increased in size so that two or three segments will complete the gill or they may be reduced in size so that more segments will be required.

Figure 3:
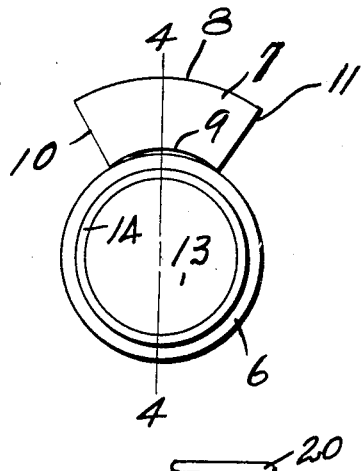
Fig. 3 is an end view of the tube with one section in position just prior to welding.
Figure 4:
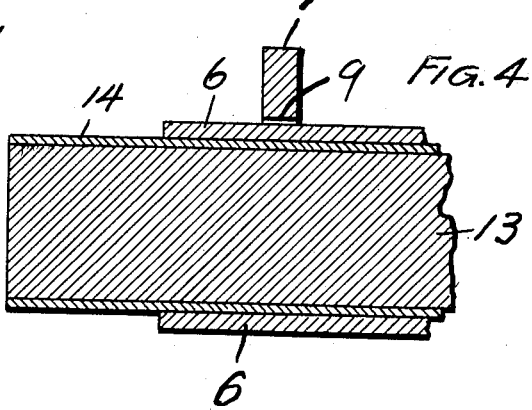
Fig. 4 is a section taken on the line 4—4 of Fig. 3.

The gill or fin 7 consists of an arcuate segment having an outer surface 8. This surface may be either curved as illustrated in the drawing or it may be left straight. The inner surface 9 of this member is curved as illustrated in Fig. 3, the curvature of this surface, however, being struck on the smaller diameter than the outside diameter of the tube 6, the reason for which will be explained later.

Figure 2:
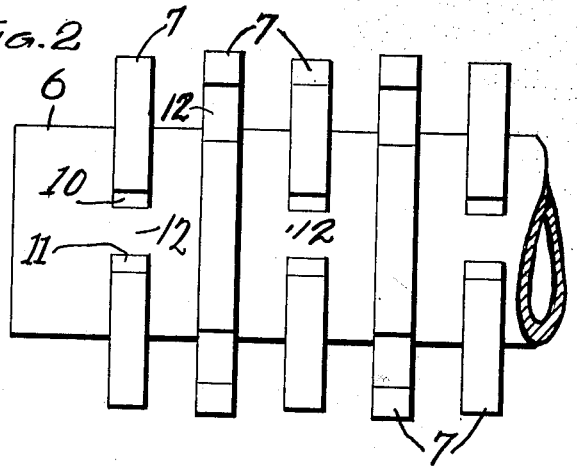
Fig. 2 is a side elevation of a fragment of a tube showing the staggering arrangement accomplished.

The member 7 is also provided with the ends 10 and 11. It will be noted from Figs. 1 and 2 that the ends 10 and 11 of adjacent gills or fins are spaced apart so as to provide passage ways 12. The passage ways between adjacent gills, however, are radially staggered so that the heated gases flowing along the tube will not pass in a straight line, but must pursue a sinuous passage. In this way, the gills, when heated air is used, will have a greater opportunity to absorb heat and transmit it to the tube, and when used for cooling purposes, the cool air due to its sinuous passage will have a greater possibility of absorbing heat from the gills. In this way, radiation to and from the tube is increased, consequently a less number of tubes can be used, thus materially reducing the cost of construction.

My method of applying the gills or fins to the tube is as follows:—

Figure 5:
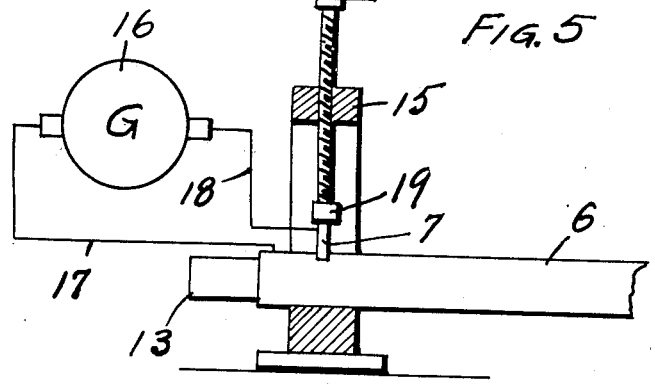
Fig. 5 is a diagrammatic view showing one way of carrying out my method.

I first take a mandrel 13 and provide it with a coating 14 which coating is of such material that it will not fuse with or adhere to the tube 6. The mandrel together with the tube is then placed in a press 15. This press may be either a screw press as disclosed in Fig. 5, or any other suitable structure by means of which pressure can be applied.

16 represents a source of electrical energy such as a generator. A conductor 17 leading from this source of energy is attached to the tube. Another conductor 18 leading from the same source is attached to one of the gill ring segments. This gill ring segment is secured to the ram or pressure member 19 of the press 15. The electrical current is then turned on and the segment brought into contact with the outer surface of the tube 6. The segment is then slightly backed away from the tube 6 so that an electric arc will be created. This electric arc is maintained until the surfaces of the gill ring and the tube adjacent each other become sufficiently heated to be plastic after which pressure is applied by means of a hand wheel 20 as disclosed in Fig. 5 or by a proper appliance for operating the press; this source of pressure depending upon the kind of press employed.

The pressure is great enough to cause the lower surface of the gill ring to move outwardly so that the entire surface 9 of the gill ring segment will contact with the surface of the tube 6. After the entire surface has been thus contacted with, the electric current is closed off and the press permitted to cool, the pressure being maintained during this cooling period.

In this way, it is possible for me to obtain a metal to metal contact throughout the opposing surfaces of the gill ring segments and the tube and consequently, no air spaces are left and a much more perfect radiation or absorption is obtained.

While I have shown my device as having all the segments in the same radial plane, this is not essential as each segment of the gill ring can be staggered longitudinally of the other so that a gill ring tube thus constructed would have the appearance of an interrupted screw thread.

The essential feature of my device and method of construction is that the gills or fins are formed in sections and have a metal to metal contact with the tube throughout their length, this metal to metal contact being obtained by heat and pressure.

My purpose of using the mandrel 13 is to prevent the tube from becoming deformed under pressure while the segments are being welded on, because if the interior of the tube were left open, the pressure would have a tendency to deform the tube, consequently subsequent sections would not fit thereon.

Another great advantage of my structure is that after the rings have been welded or secured by my method, they form an integral part of the tube and will not become loosened as may be the case where the gill rings are shrunk on to the tube or spot welded, because in such cases unequal contraction and expansion will have a tendency to cause the gill rings to loosen.

Another particular advantage of my device is that in the event after inspecting the tube, it is discovered that certain portions thereof are not properly secured, these portions can be removed and new portions substituted therefor. This applies solely to the gills or fins, because heretofore, where solid rings were used and shrunk on or even spot welded, it was necessary to remove all of the rings to one side of the gill ring in order to replace a defective gill ring, thus causing a great loss not only in material because the other rings had to be destroyed in order to remove them and also a loss in labor.

Having fully described my invention, what I claim is:

1. The method of making a gill ring tube, consisting in forming gill ring segments with a welding surface of greater curvature than said tube, superimposing said segments upon said tube so that said difference in relative curvature spaces the segments from the tube, and then welding said segments in place, whereby the respective curvatures become identical.

2. The method of making a gill ring tube, consisting of forming gill rings with an inner welding surface of a curvature greater than that of said tube, superimposing said rings on the tube, fusing the opposed surfaces together, and increasing the pressure between said tube and rings whereby said respective curvatures become identical.

3. The method of making a gill ring tube, consisting of forming gill ring segments of inside welding surface curvature different than the exterior curvature of the tube, placing said segments upon said tube, and then welding said parts together while applying pressure therebetween to change their relative curvature of welding surfaces to like curvature.

4. The method of making gill ring tubes, consisting of forming gill ring segments having their inside welding wall surfaces of greater curvature than the exterior welding wall surface of said tube upon which they are to be mounted, welding said segments in position on said tube, and then applying pressure to said segments while heated to conform their curvature to that of said tube.

In testimony whereof I have affixed my signature.

FREDERICK E. KEY.